(12) United States Patent
Carlson et al.

(10) Patent No.: US 9,953,309 B2
(45) Date of Patent: Apr. 24, 2018

(54) THIRD PARTY INTEGRATED SECURITY SYSTEM

(75) Inventors: Mark Carlson, Half Moon Bay, CA (US); Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 755 days.

(21) Appl. No.: 13/237,690

(22) Filed: Sep. 20, 2011

(65) Prior Publication Data

US 2012/0109818 A1 May 3, 2012

Related U.S. Application Data

(60) Provisional application No. 61/385,095, filed on Sep. 21, 2010.

(51) Int. Cl.
| | | |
|---|---|---|
| G06Q 40/00 | (2012.01) | |
| G06Q 20/32 | (2012.01) | |
| G06Q 20/10 | (2012.01) | |
| G06Q 20/36 | (2012.01) | |

(52) U.S. Cl.
CPC ......... *G06Q 20/3223* (2013.01); *G06Q 20/10* (2013.01); *G06Q 20/325* (2013.01); *G06Q 20/363* (2013.01); *G06Q 20/3672* (2013.01)

(58) Field of Classification Search
USPC ....... 235/492; 705/39–41, 35, 44, 14.51, 50, 705/16; 455/411, 406; 445/408
See application file for complete search history.

(56) References Cited

U.S. PATENT DOCUMENTS

| | | | |
|---|---|---|---|
| 6,105,008 A | 8/2000 | Davis et al. | |
| 7,822,666 B1 * | 10/2010 | Bursch | G06F 21/34 |
| | | | 235/380 |
| 7,849,005 B2 | 12/2010 | Ong | |
| 7,865,434 B2 | 1/2011 | Sheets | |
| 8,098,490 B2 | 1/2012 | Hata | |
| 8,145,568 B2 * | 3/2012 | Rackley et al. | 705/40 |
| 8,336,088 B2 | 12/2012 | Raj | |

(Continued)

FOREIGN PATENT DOCUMENTS

| | | |
|---|---|---|
| KR | 20030028126 | 4/2003 |
| KR | 100423390 B1 | 3/2004 |

(Continued)

OTHER PUBLICATIONS

International Search Report and Written Opinion dated Apr. 9, 2012 for International Application No. PCT/US2011/052580, 9 pages.
U.S. Appl. No. 61/428,144, entitled, "Management of Prefunded Accounts," 26 pages.

*Primary Examiner* — Gregory A Pollock
(74) *Attorney, Agent, or Firm* — Kilpatrick Townsend & Stockton LLP

(57) ABSTRACT

A third party payment system is provided which allows a user to conduct transactions through payment accounts stored on the third party payment system. The user can enroll in the third party payment system and create an account with registered payment accounts. The user can access the payment accounts via a mobile device and load the payment data associated with a payment account to the mobile device. The user can then utilize the mobile device to provide payment during a transaction.

16 Claims, 10 Drawing Sheets

(56) References Cited

U.S. PATENT DOCUMENTS

| | | |
|---|---|---|
| 8,352,323 B2 * | 1/2013 | Fisher .................... 705/16 |
| 8,380,177 B2 * | 2/2013 | Laracey ................ 455/414.1 |
| 2004/0117302 A1 * | 6/2004 | Weichert et al. ............ 705/40 |
| 2006/0014518 A1 * | 1/2006 | Huh et al. ................ 455/406 |
| 2007/0185822 A1 | 8/2007 | Kaveti et al. |
| 2008/0010190 A1 | 1/2008 | Rackley, III et al. |
| 2008/0059370 A1 | 3/2008 | Sada et al. |
| 2009/0090783 A1 * | 4/2009 | Killian et al. ............. 235/492 |
| 2010/0114733 A1 | 5/2010 | Collas et al. |
| 2011/0055077 A1 | 3/2011 | French |
| 2011/0060629 A1 | 3/2011 | Yoder |
| 2011/0087530 A1 | 4/2011 | Fordyce, III et al. |
| 2012/0265684 A1 | 10/2012 | Singh |
| 2013/0023294 A1 | 1/2013 | Singh |

FOREIGN PATENT DOCUMENTS

| | | |
|---|---|---|
| KR | 100423401 | 3/2004 |
| KR | 20040025404 A | 3/2004 |
| KR | 20040045521 A | 6/2004 |
| KR | 20070059612 A | 6/2007 |
| KR | 20070071362 A | 7/2007 |
| KR | 20100029427 A | 3/2010 |
| KR | 20100059760 A | 6/2010 |
| WO | 2003/040877 | 11/2002 |
| WO | WO 09/003605 A2 | 1/2009 |
| WO | 2009/158088 | 5/2009 |
| WO | WO 10/079182 A1 | 7/2010 |

\* cited by examiner

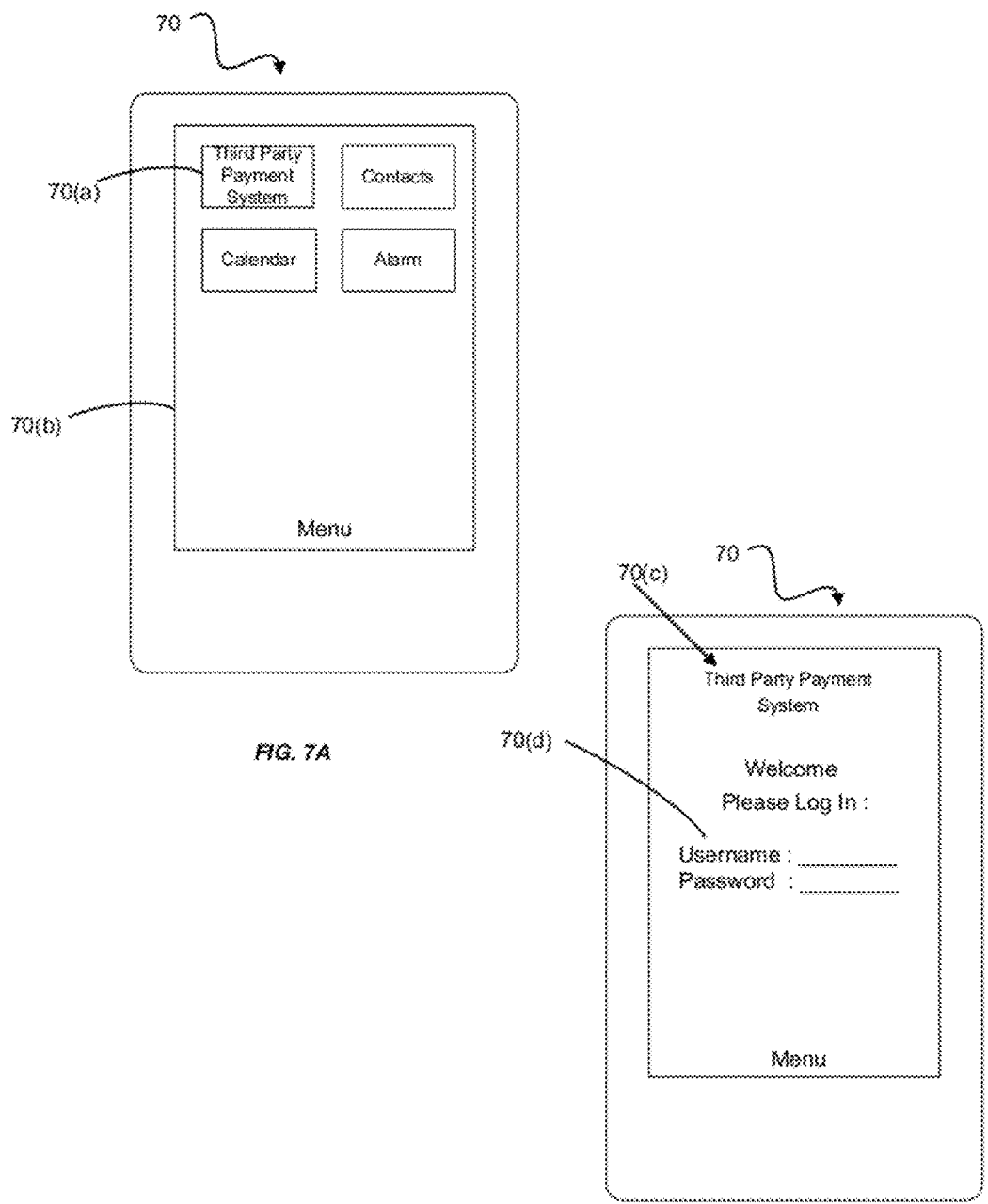

THIRD PARTY INTEGRATED SECURITY SYSTEM

The present application is a non-provisional application of and claims priority to U.S. Provisional Application No. 61/385,095, filed on Sep. 21, 2010, the entire contents of which are herein incorporated by references for all purposes.

BACKGROUND

A typical consumer may store personal information (payment information, user settings, etc.) in a variety of places, such as third party systems. These third party may include, for example, online websites, user networks, applications, user ecosystems, etc. These "places" may be platforms that comprise payment systems, and can store data relating to payment information (e.g. credit card number, billing address, etc.) for use within the payment system. For example, an online website may keep a record of a consumer's payment information, after the first time the consumer made a purchase with the website. Accordingly, any subsequent purchases may be more convenient for the consumer, as the payment data will not need to be re-entered. Similarly, online social networks, in-person networks and clubs, music stores, etc., often will maintain databases of their user's information.

This user and associated payment information is often not usable outside the specific payment system. Thus, data stored in one online merchant may not be usable in a social network or with another online vendor. A consumer may not be provided a full range of services for the same payment information (rewards, fraud check, notifications, etc.) when utilizing different platforms. Embodiments of the invention address these problems, and allow for integration across various systems. Consumer information may be shared, when appropriate, and the consumer may receive additional incentives or other value added services across platforms.

Embodiments of the invention address these and other problems, individually and collectively.

BRIEF SUMMARY

Embodiments of the present invention provide a third party payment system in which a user can enroll by creating an account and can register a plurality of payment devices with the account. The user can then access the account via a mobile device and load the payment data associated with a payment device onto the mobile device. The user can then utilize the mobile device as a payment instrument when conducting a transaction with a vendor. The payment data can be provided to the vendor via a short range signal transmission, e.g., near field communication (NFC), or via another wired or wireless communication medium, e.g., cellular communication, WiFi, Ethernet, etc.).

In one embodiment, a method for utilizing payment data stored on a third party payment system is provided. The method includes accessing an account with a mobile device through a first communication channel, providing information associated with the user account on the mobile device, selecting a first payment account registered with the user account, loading the payment data associated with the first payment account onto the mobile device, transmitting the loaded payment data through a second communication channel to conduct a transaction. The user account is stored on a third party payment system. The user account information includes at least one payment account registered with the user account.

In another embodiment, a mobile device is provide which includes an antenna coupled to a communication interface for wirelessly transmitting data across a first communication channel, an input element, a processor coupled to a computer readable medium, the computer readable medium having code executable by a processor for implementing a method. The method includes accessing a user account with a mobile device through a first communication channel, receiving a selection of a first payment account through the input element of the mobile device, and loading payment data associated with the first payment account onto the mobile device. The user account is stored on a third party payment system. The first payment account is registered with the user account on the third party payment system. The antenna, the communication interface and the input element are coupled to the processor.

In yet another embodiment, a method for conducting a transaction through a third party payment system is provided. The method includes accessing a user account registered on the third party payment system through a first communication channel, receiving a selection of a payment account registered with the user account, sending payment data associated with the payment account to a mobile device. Access is granted through at least one security feature associated with the user account.

In a further embodiment, a server computer having a computer readable medium including code executable by a processor for implementing a method is provided. The method includes receiving, on a communication interface, information associated with a user through a first communication channel from a mobile device, accessing, on a database coupled to the server computer, a user account associated with the information, retrieving, from the database, payment data associated with a payment account registered with the user account, and sending, through the communication interface, the payment data associated with the selected payment account to the mobile device. The user account is stored in a memory element coupled to the server compute. The retrieval is based on a selection received through the first communication channel from the mobile device. The payment data is loaded onto the mobile device in order to conduct a transaction.

These and other embodiments of the invention are described in further detail below.

BRIEF DESCRIPTION OF THE DRAWINGS

FIGS. 7A-7E show exemplary screenshots of a third party payment system application on a mobile device according to embodiments of the invention.

DETAILED DESCRIPTION

Figure 1:
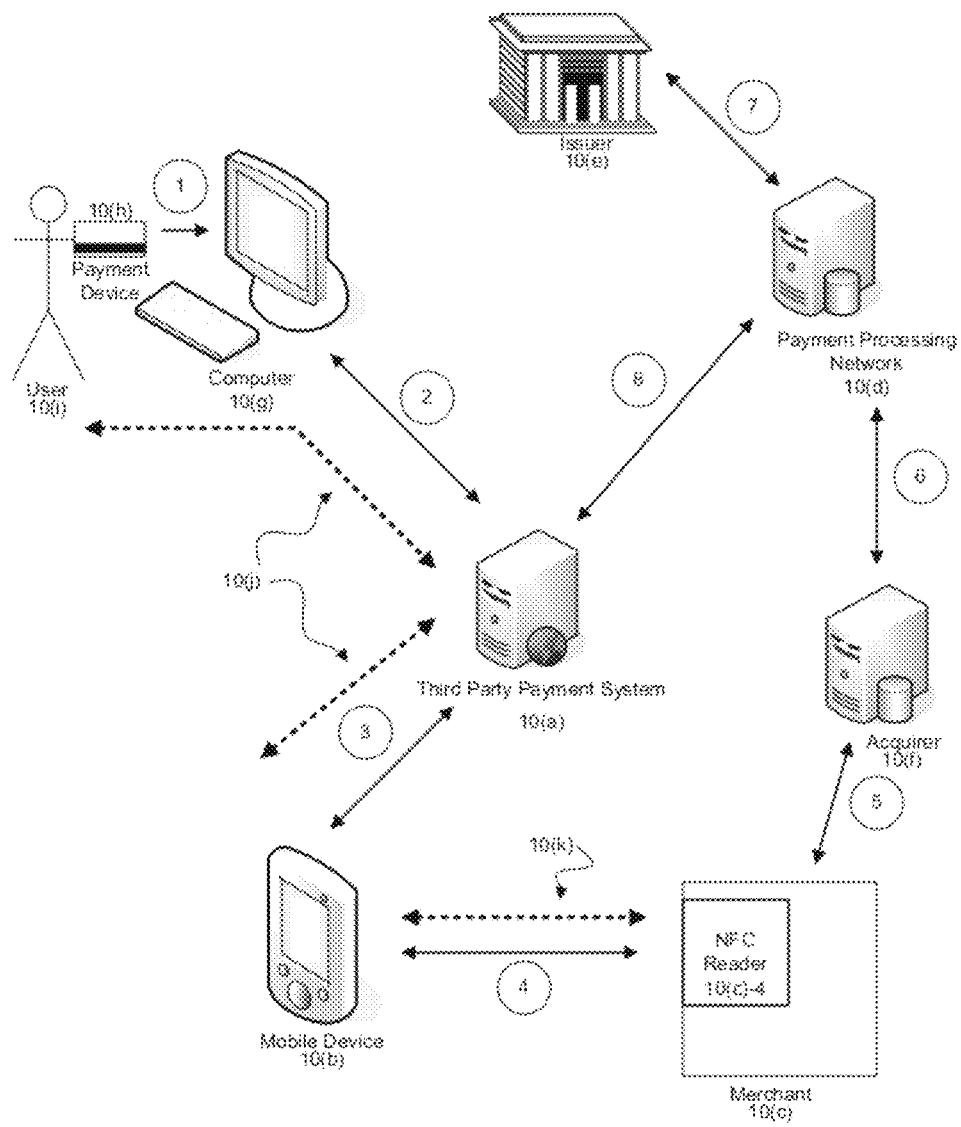
FIG. 1 shows a system for conducting a transaction through a third party payment system according to embodiments of the invention.

Merchants providing a central marketplace for various products allow for consumers to complete multiple purchases without conducting multiple transactions. Some of these merchants directly provide these products to consumers, while others partner with numerous other merchants in order to provide these products to the consumer. In either situation, a consumer has the ability to pay a single transaction to the merchant, often having the option to create an account with that merchant in order to conduct future transactions. The account can include the consumer's payment information and contact information. Accordingly, the merchant becomes a payment system between the consumer and a partner of the merchant providing its merchandise on the merchant marketplace. However, the consumer is only providing payment to the singular entity, e.g., the merchant, during the transaction.

Embodiments of the invention are directed to improved systems and methods for integrating payment systems. In particular, the present embodiments provide a system in which a user can enroll in a third party payment system and utilize the third party payment system to conduct point of sale transactions at various merchant locations, including in person and online. For example, a user can enroll with a merchant website for a marketplace in which that user can purchase products directly from the merchant website, or from other vendors not associated with the website. In the case where the user purchases from the website, the products can be sold by the company hosting the website or by vendors who partner with the website, such as that described in previous paragraphs. In the case where the user purchases from other vendors, the user can access payment data associated with a payment account (e.g., credit card, debit card, gift card, etc.) which is stored on the third party payment system. The user can then load this payment data to a device, such as a mobile device (e.g., SmartPhone), for use during a transaction.

In embodiments of the invention, the user may enroll with the website and create an account with the third party payment system through the company website. The account information can include user preferences, contact information, billing address, and a plurality of payment accounts and associated payment data (e.g., personal account number (PAN), card verification value (CVV, CVV2), etc.). Accordingly, once entered by the user, the payment data associated with the payment account is securely stored for future use. In some embodiments, a user may register a plurality of payment accounts with the website.

In further embodiments of the invention, the user can utilize a mobile device to access his/her account and payment data associated with a registered payment account. The account interface can display an option for the user to load a registered card to the mobile device. The mobile device can be a mobile phone, which is capable of securely communicating through the Internet in order download the payment data on the mobile device prior to conducting a transaction. The mobile device can also be capable of communicating with a point of sale (POS) terminal that has a near field communication (NFC) enabled reader. The mobile device can then communicate the loaded payment data to the POS terminal to provide payment during a transaction.

The user can enable their phone with a program associated with the third party payment system, including the payment data stored in the third party payment system service. The application can be loaded to the mobile device along with the payment data and/or prior to accessing the account and loading the payment data (including card on file account information for any card). The device may comprise Near Field Communication (NFC) enabled phones, but other payment initiation methods are available (such as "bump" technology as described in U.S. patent application Ser. No. 12/954,111, filed on Nov. 25, 2009, which is herein incorporated by reference for all purposes). Users can then make brick payments (e.g. in-store payments), face to face payments, or remote payments. By this method, the user's purchase transactions can be tied into the third party payment system's database. The user can also select one or more value added services to use with her account, such as alert messages, rewards, etc.

In certain embodiments, a user may obtain store credit with the third party payment system. For example, if the user purchased a product directly from the third party payment system and later returned the product and/or received a transfer from another user on the third party payment system, and/or a gift card for the third party payment system. In further embodiments, a store credit on the third party payment system could potentially be used as a reward for subscribing to the integration. This can reward both the third party payment system and the user.

Prior to discussing further aspects of embodiments of the invention, further descriptions of some additional terms may be useful.

A "mobile device" may be any suitable mobile communication device. A suitable mobile device may be in the form of a mobile phone, and may include an antenna, as well as a processor and a memory. It may also include a contactless element so that it can communicate using a short range wireless communication medium.

A "payment account" can be an account which can be used for payment, and can typically be associated with any suitable device which can be utilized to facilitate payment from between two or more parties during a transaction. For example, a payment account can be associated with a credit card, a debit card, a gift card a check, a bank account or other similar device.

"Payment data" refers to any data that can be associated with a payment account and utilized to complete a transaction. For example, payment data can include a personal account number (PAN), a card verification value (CVV, CVV2, dCVV2), user billing address, user name, issuer information (e.g., routing number, name, etc.) and any additional payment information required to complete a transaction between two or more entities.

An "access device" may be any suitable device that can interact with the mobile device and/or a payment card. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

An "issuer" may be any business entity (e.g., a bank). Typically, an issuer is a financial institution, such as a bank. The issuer issues portable consumer devices to the consumer that may be used to conduct a transaction, such as a credit or debit card to the consumer.

An "acquirer" is typically a business entity, e.g., a commercial bank that has a business relationship with a particular merchant. Some entities such as American Express perform both issuer and acquirer functions. Embodiments of the invention encompass such single entity issuer-acquirers.

A "payment processing network" may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

A "server computer" can be a powerful computer or a cluster of computers. For example, the server computer can be a large mainframe, a minicomputer cluster, or a group of servers functioning as a unit. In one example, the server computer may be a database server coupled to a Web server and may host a merchant website.

An "authorization request message" can include a request for authorization to conduct an electronic payment transaction. It may further include an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. An authorization request message may comprise a number of data elements including one or more of the following, in any suitable combination, an account number for a payment card or other suitable portable consumer device, a merchant ID, a transaction amount, a card verification value (CVV), etc.

An "authorization response message" can be a message that includes an authorization code, and may typically be produced by an issuer. The authorization response message can provide an indication of whether or not a transaction is authorized.

I. Systems

A system for retrieving payment data stored on a third party payment system is illustrated in FIG. 1. Exemplary systems and devices utilized within the system of FIG. 1 are further described within reference to FIGS. 2-4. Although a small number of users, client devices, merchants, acquirers, payment processing networks, third party payment systems, and issuers are shown in FIG. 1, it is understood that embodiments of the invention are not limited thereto and embodiments of the invention may include any suitable number of entities.

FIG. 1 shows a block diagram of a system in accordance with an embodiment of the invention. As shown in step 1, a user 10(i) may use a client computer, such as a personal computer, a mobile device, or a SmartPhone, 10(g) to access the Internet or to directly communicate with the third party payment system 10(a) through a first communication channel 10(j). The third party payment system 10(a) may be a social network, website, program, merchant, etc., as described above. The third party payment system 10(a) may comprise a computer apparatus, and may also include a payment system that comprises a server computer and a database coupled to the server computer. The computer apparatus and server computer may comprise a processor and a computer readable medium. The computer readable medium may comprise code or instructions for performing transaction functions, such as purchases and transfers.

Figure 2:
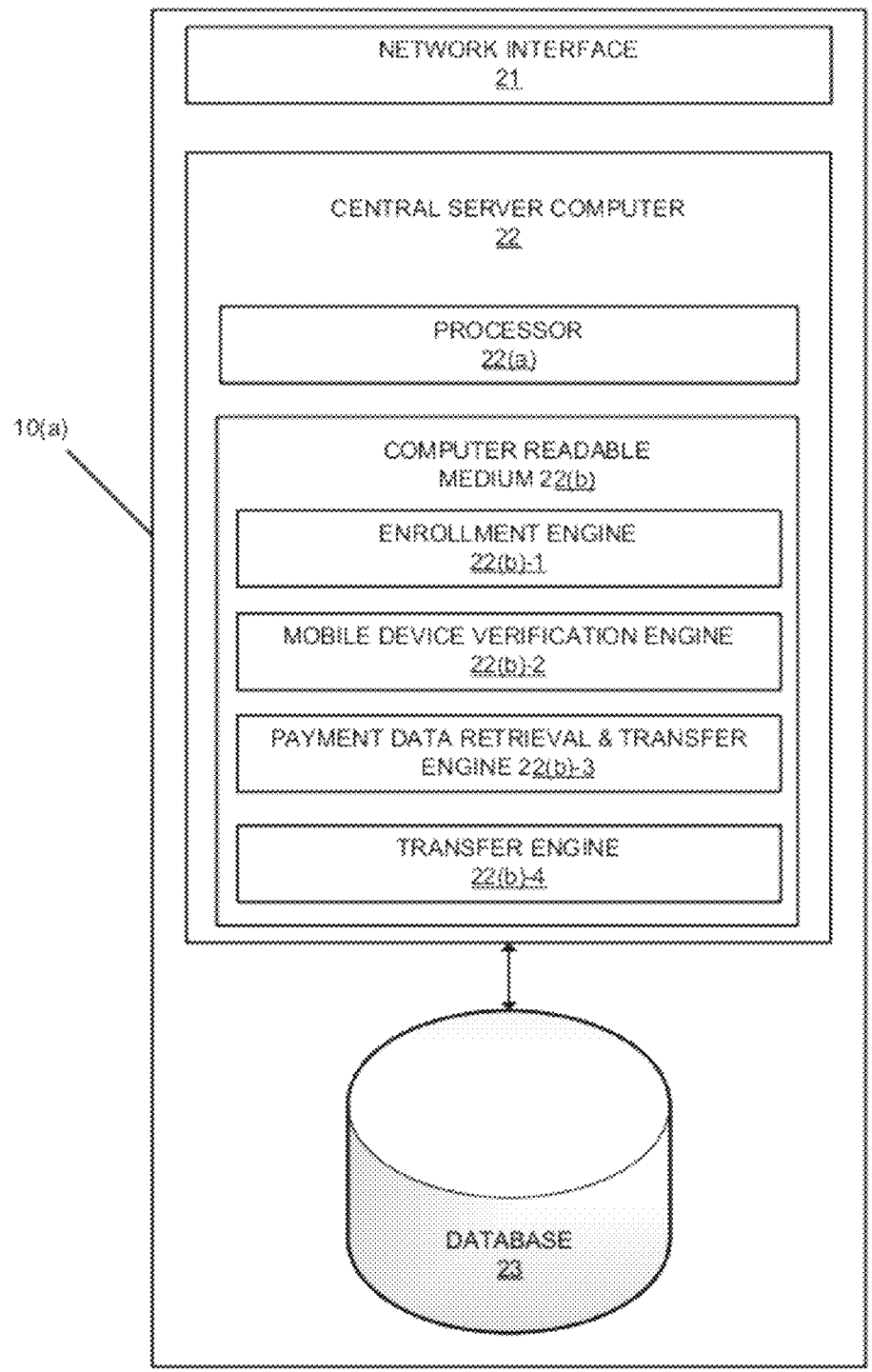
FIG. 2 shows an exemplary third party payment system according to embodiments of the invention.

Referring now to FIG. 2, an exemplary third party payment system is illustrated in an embodiment of the present invention. The third party payment system 10(a), can include a central server computer 22 for processing user accounts and transactions, a database for storing user accounts and associated information, and a network interface 21 for permitting data exchange with the network and/or any other computer or device (e.g., mobile device) described with respect to FIG. 1. The central server computer 22 can further include a processor 22(a) coupled to a storage device, such as a computer readable medium 22(b), that stores instructions capable of being executed by the processor 22(a). The instructions can be comprised in software which includes applications for enrolling users, granting access to user account, retrieving information associated with user accounts and transferring user account information over the network.

The computer readable medium 22(b) can include a fixed disk or a system memory, disk drives, optical storage devices, solid-state storage device such as a random access memory ("RAM") and/or a read-only memory ("ROM"), which can be programmable, flash-updateable and/or the like. The computer-readable medium 22(b), together (and, optionally, in combination with database 23 and other storage devices) comprehensively represent remote, local, fixed, and/or removable storage devices plus storage media for temporarily and/or more permanently containing, storing, transmitting, and retrieving computer-readable information.

Additionally, the computer readable medium 22(b) can include several engines, which utilize instructions stored on the computer readable medium to cause the processor to perform various functions for the third party payment system. For example, the computer readable medium can include an enrollment engine 22(b)-1, which provides a user with a form having fields in which the user can input contact information and payment account information. The enrollment engine 22(b)-1 can retrieve the information and form the account on the database for the user. In some embodiments, the enrollment engine 22(b)-1 can include an algorithm to generate an alias and/or an account number for each user upon enrollment. In other embodiments, the enrollment engine 22(b)-1 can provide the user with a notification, e.g., short message service (SIMS) text, email, etc., upon enrollment.

The computer readable medium can also include a mobile device verification engine, which checks the MSISDN of each incoming query from a mobile device being utilized to access a user account. As will be described with reference to FIG. 6, each mobile device and computing device capable of accessing the account can be registered with the third party payment system. If the mobile device verification engine 22(b)-2 does not recognize a device, the user can be prompted with additional security features, e.g., security questions in order to be granted access to the account on an unknown, or unregistered device. In some embodiments, the user can be granted limited access to the account if accessing the account from an unregistered device.

The third party payment system 10(a) can further include a payment data and retrieval engine 22(b)-3, which utilizes the user's account alias and password to identity and retrieve the user's account information. The payment data and retrieval engine 22(b)-3 can additionally receive the user request to load a selected payment account stored on the third party payment system 10(*a*) and securely forward the payment data associated with that payment account to the user's mobile device. In some embodiments, the payment data retrieval and transfer engine 22(*b*)-3 can include an encryption algorithm to encrypt payment data prior to sending the payment data to the user's mobile device. Accordingly, an application on the user's mobile device can include a shared key, which can be utilized to the decrypt to the loaded payment data.

In further embodiments, the third party payment system can be capable of conducting transfers both between account holders and from an account holder to another individual. In such embodiments, the system can include a transfer engine 22(*b*)-4, which can be utilized to conduct a transfer directly between accounts on the third party payment system through direct communication with a payment processing network, or through credits, e.g., rewards points or monetary amount, given to a transferee for the third party payment system retail store. In such an embodiment, the third party payment system can act as the merchant between the sending and receiving parties. The transfer engine 22(*b*)-4 can additionally include instructions, which cause a notification to be sent to each of the sending and receiving parties that a transfer has been conducted.

The central server computer 22 may also comprise software elements, including an operating system and/or other code, such as an application program (which may be a client application, Web browser, mid-tier application, RDBMS, etc.). It may be appreciated that alternate embodiments of a central server computer 30 may have numerous variations from that described above. For example, customized hardware might also be used and/or particular elements might be implemented in hardware, software (including portable software, such as applets), or both. Further, connection to other computing devices such as network input/output devices may be employed.

Referring back to FIG. 1, the third party payment system 10(*a*) may communicate through the first communication channel 10(*j*) (e.g., Internet), which the user 10(*i*) may access using a client computer 10(*g*) shown in step 2. In other embodiments, the first communication channel 10(*j*) is formed between a user's mobile device 10(*b*) and the third party payment system 10(*a*). In such an embodiment, the mobile device 10(*b*) is capable of communicating through the Internet, e.g., through WiFi or a mobile gateway (not shown) communicatively coupled to the third party payment system 10(*a*). The third party payment system 10(*a*) may also have a direct connection to the user 10(*i*). The user 10(*i*) may provide payment information, which includes account information and contact information, through the first communication channel 10(*j*) to the third party payment system 10(*a*). Account information may include a primary account number (PAN), expiry date, etc. and the user's name and billing address, and also shipping information. The user may also be asked to provide an alias for identification by other users and by the system, e.g., during login. This can expedite both user transactions and user-to-user transactions. The third party payment system 10(*a*) may store this payment information and alias for each registered user.

After initial enrollment is complete, the user 10(*i*) may then access the user account on the third party payment system 10(*a*) through the user's mobile device 10(*b*) in order to complete a payment at a merchant location. In different embodiments, the user can either access the third party payment system via the Internet or through an application, which can be downloaded on the mobile device 10(*b*). In either embodiment, the user can access the account via the user assigned alias and at least one security feature.

Security features can include any password, cryptogram, mobile station in international subscriber directory number (MSISDN) or other security means which allows the user to identify themselves to the third party payment system. In one embodiment, the user may have an application on the mobile device to access the third party payment system 10(*a*). The user may enter the user alias and a password. In another embodiment, the user can enter an alias and the CVV from the primary payment account registered with the account, e.g., the default payment card utilized for payment. The MSISDN can additionally be utilized by the third party payment system 10(*a*) to identify if the user, assuming that the user is attempting access through his or her own mobile device, which can also be registered (e.g., via 10 digit telephone number) with the third party payment system 10(*a*). If the user is not able to access the third party payment system 10(*a*) from a known device, the user may be prompted to enter an additional security feature, such as a portion of a social security number, a mother's maiden name, or answer to security questions for which the user can provide responses during initial enrollment. In other embodiments, the security feature can include biometric or other data, which can be taken by the mobile device, such as a voice clip for voice recognition or a fingerprint, e.g., taken by a touch screen enabled mobile device.

Figure 3:
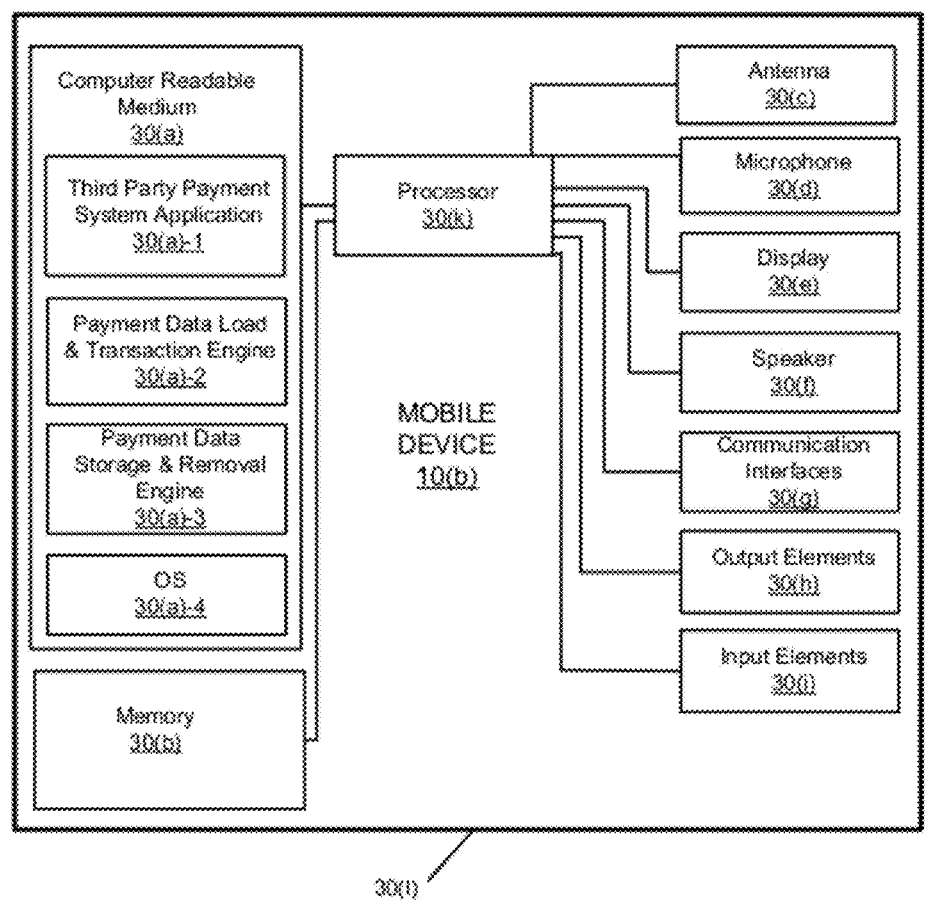
FIG. 3 shows an exemplary mobile device according to embodiment of the invention.

Referring now to FIG. 3, an exemplary mobile device architecture is illustrated which can be utilized in the system shown in FIG. 1, according to an embodiment of the invention. As shown in FIG. 3, the mobile device 10(*b*) may be in the form of cellular phone, having a display 30(*e*), input elements 30(*i*) to allow a user to input information into the mobile device 10(*b*) (e.g., keyboard), and a memory 30(*b*). The mobile device 10(*b*) can also include a processor 30(*k*) (e.g., a microprocessor) for processing the functions of the mobile device 10(*b*), at least one antenna 30(*c*) for wireless data transfer, a microphone 30(*d*) to allow the user to transmit his/her voice through the mobile device 10(*b*), and speaker 30(*f*) to allow the user to hear voice communication, music, etc. In addition, the mobile device 10(*b*) may include one or more communications interfaces 30(*g*) in addition to antenna 30(*c*), e.g., a wireless interface coupled to an antenna. The communications interfaces 30(*g*) can provide a near field communication interface (e.g., contactless interface, Bluetooth, optical interface, etc.) and/or wireless communications interfaces capable of communicating through a cellular network, such as GSM, or through WiFi, such as with a wireless local area network (WLAN). Accordingly, the mobile device 10(*b*) may be capable of transmitting and receiving information wirelessly through both short range, radio frequency (RF) and cellular and WiFi connections. Additionally, the mobile device 30 can be capable of communicating with a global positioning system (GPS) in order to determine to location of the mobile device. In the embodiment shown in FIG. 3, antenna 30(*c*) may comprise a cellular antenna (e.g., for sending and receiving cellular voice and data communication, such as through a network such as a 3G or 4G network), and interfaces 30(*g*) may comprise one or more local communication. In other embodiments contemplated herein, communication with the mobile device 30 may be conducted with a single antenna configured for multiple purposes (e.g., cellular, transactions, etc.), or with further interfaces (e.g., 3, 4, or more separate interfaces).

Figure 7C:
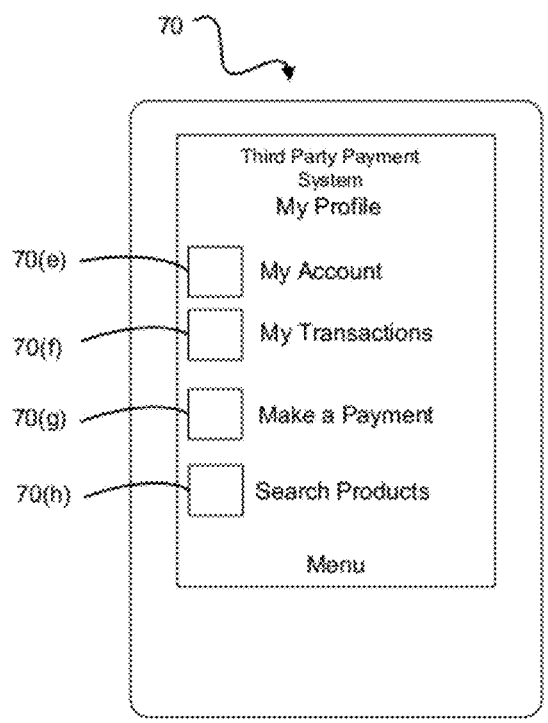

The mobile device 10(*b*) can also include a computer readable medium 30(*a*) coupled to the processor 30(*k*), which stores application programs and other computer code instructions for operating the device, such as an operating system (OS) 30(a)-4. In an embodiment of the present invention, the computer readable medium 30(a) can include a third party payment system application 30(a)-1. The third party payment system application can automatically run each time that a user accesses the application, such as illustrated in FIG. 7B. In some embodiments, the third party payment system application 30(a)-1 can run continuously (e.g., in the background) or at other times, such as when payment data is being stored on the mobile device and/or a transaction is being conducted with the mobile device. In addition, the application can include a customizable user interface (UI), which can be determined by the user's preferences through application level programming. The application 30(a)-1 can be used to display user account information allowing for user input, as is further discussed later with reference to FIGS. 7A-7E.

Referring again to FIG. 3, the computer readable medium 30(a) can also include a payment data load and transaction engine 30(a)-2. The payment data load and transaction engine 30(a)-2 can run each time that a user selects to load payment data to the mobile device from the third party payment system. The central processing server of the third party payment system can send instructions for the payment data load and transaction engine 30(a)-2 to run. Additionally, the payment data load and transaction engine 30(a)-2 can run each time that a user conducts a transaction with the mobile device 10(b). Accordingly, each time that a merchant reader transmits an inquiry signal to the mobile device when the third party payment system application 30(a)-1 is running, e.g., through a communication interface, or a user manually selects to conduct a transaction, e.g., through an input of the mobile device, the payment data load and transaction engine 30(a)-2. The payment data load and transaction engine 30(a)-2 can include instructions, for example, to receive payment data through a communications interface 30(g), send payment data to a memory 30(b) of the mobile device, retrieve payment data from the memory 30(b) of the mobile device 30, and send payment data to a communications interface 30(g) of the mobile device 30.

The computer readable medium 30(a) on the mobile device 10(b) can also include a payment data storage and removal engine 30(a)-3, which causes the payment data to be securely stored in and deleted from the memory 30(b) of the mobile device 30. In some embodiments, the payment data is permanently stored in the memory of the mobile device 10(b) and is encrypted. The user may then be prompted to enter a passphrase or other security feature prior to gaining access to the payment data during a transaction. In other embodiments, the payment data is stored in the memory 30(b) of the mobile device 10(b) for a predetermined period. This period could include, for instance, a number of transactions (e.g., after 1 transaction), an amount of time (e.g., after 1 hour), or after an event (e.g., after the application is closed on the mobile device). After such predetermined period is met, the payment data storage and removal engine 30(a)-3 can delete the payment data from the memory 30(b) of the mobile device. Accordingly, the payment data storage and removal engine 30(a)-3 can include instructions to receive the payment data from the payment load and transaction engine 30(a)-1 and to both securely write (e.g., with encryption algorithm) the payment data to the memory of the mobile device and to delete (e.g., with encryption key) the payment data from the memory 30(b) of the mobile device 10(b). In further embodiments, the payment data storage and removal engine 30(a)-3 can include instructions which are written to the memory of the mobile device that cause the payment data to decay from the memory 30(b) after a predetermined time period. In other embodiments, the removal of the payment data can be a result of a manual input by the user of the mobile device 10(b).

Referring back to FIG. 1, once the user accesses his or her account on the third party payment system with the mobile device 10(b), as shown in step 3, the user can view any account details, e.g., transactions, billing information, registered payment accounts, etc. The user can then chose to load a registered payment card and/or other payment account (e.g., check, bank account, giftcard, etc.) data to the mobile device. The payment data can be permanently loaded, e.g., stored in a memory element of the mobile device, or temporarily loaded onto the mobile device, e.g., decay over a period of time. For example, the payment data may be automatically erased from the mobile device 10(b) after 2 minutes, 5 minutes, 30 minutes, 1 hour, 1 day, 1 week, or more or less than these amounts of time. A third party payment system application on the mobile device, if utilized, can determine how the payment data is loaded to the device. In certain embodiments, the mobile device can include a partitioned memory, which requires encryption to access the payment data for secure storage in case the mobile device is lost or stolen. All of these features provide security to the overall system in that the payment data can be provided to the mobile device on demand.

With the payment data loaded from the third party payment system 10(a) onto the mobile device 10(b), the user can conduct a transaction at a merchant location 10(c) utilized the mobile device 10(b) as a payment device, as shown in step 4. In certain embodiments, the payment data can be communicated to the merchant via a second communication channel 10(k). The second communication channel 10(k) may be formed between the mobile device 10(b) and an access device, which includes an NFC capable reader 10(c)-4, at the merchant location. The second communication channel 10(k) can use any suitable communication protocol (e.g., Bluetooth™) and can use any suitable optical, electrical, or magnetic (or any combination thereof) mechanism of communication. Typically, the second communication channel 10(k) is a short range communication channel (e.g., less than 10, 5, 1, or 0.1 feet) which only works within a short physical distance.

After the payment data is communicated to the merchant 40(c) via the second communication channel 10(k), the transaction can be processed similar to a normal card transaction. The payment data and transaction details can be forwarded to an acquirer 10(f) in an authorization request message for initial clearance and processing, such as shown in step 5. The acquirer 10(f) can be a bank associated with the third party payment system 10(a) or with the merchant 10(c), and can communicate with an issuer of the user's payment account via the payment processing system 10(d). The authorization request message can include the merchant category code, the merchant identifier and contact information, the transaction details and the user payment data. In some embodiments, the payment data is sent directly to a payment processing network from the merchant, and the acquirer in step 5 is not utilized.

The authorization request message can then be forwarded to a payment processing network 10(d) for settlement with the issuer of the account associate the payment data being utilized during the transaction, as shown in step 6.

Figure 4:
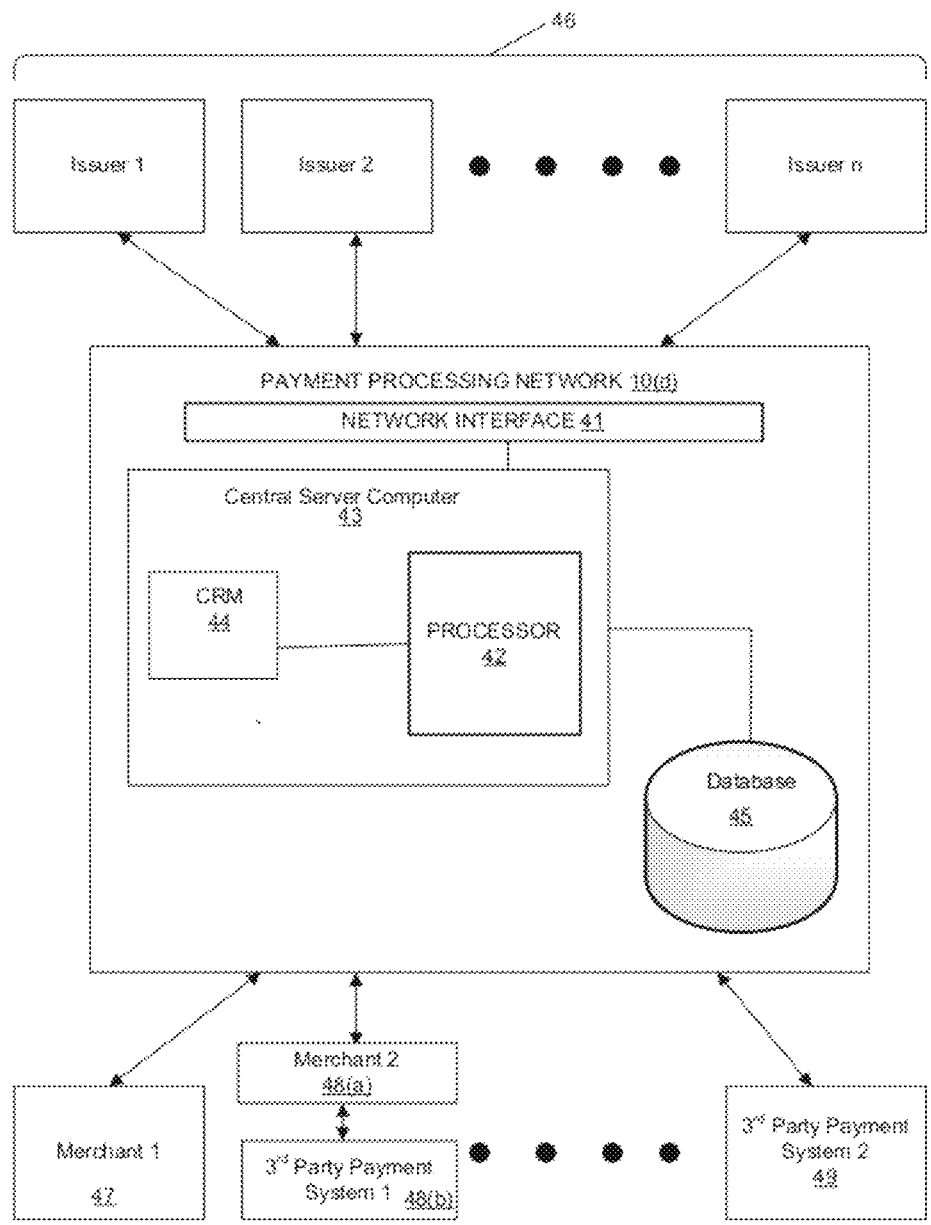
FIG. 4 shows an exemplary payment processing network system according to embodiments of the invention.

Referring now to FIG. 4, an exemplary payment processing network 10(d) is illustrated in an embodiment of the present invention. The payment processing network 10(*d*) may include data processing subsystems, networks, and operations used to support and deliver authorization services, exception file services, and clearing and settlement services. A payment processing network 10(*d*) may be able to process payment card transactions, debit card transactions, and other types of commercial transactions. The payment processing network 10(*d*) may also process authorization requests and may include a Base II system, which performs clearing and settlement services. In an embodiment of the invention, the payment processing network 10(*d*) may provide other value added services, such as fraud determination, benefit points, etc.

The payment processing network 10(*d*) may include a network interface 41 to communicate with any suitable wired or wireless network, including the Internet and may include a mobile gateway. The payment processing network 10(*d*) may have a central server computer 43 and a database 45 associated with the server computer 43 for storing account information and transaction data. The central server computer 43 may comprise a processor 42 and a computer readable medium 44. The computer readable medium 44 may comprise code or instructions for performing the various functions of the payment processing network 10(*d*).

The payment processing network 10(*d*) may further be communicatively coupled to any number of issuers 46 through the network interface 41. Each issuer 46 may provide payment accounts for the user to purchase goods or services, such as accounts associated with the payment accounts stored on the third party payment system 10(*a*) in a user account.

The payment processing network 10(*d*) can additionally be communicatively coupled to any number of merchants and/or acquirers associated with merchants. The payment processing network 10(*d*) can receive, both directly or indirectly, the authorization request messages from merchants 47, 48(*a*) and/or third party payment systems 49(*b*), 49. For example, in embodiments provided in the present invention, the payment processing network 10(*d*) can receive payments directly from merchants 47, from merchants 48(*a*) receiving payments via a third party payment system (48(*b*) and directly from a third party payment system 49, such as a transfer from an accountholder on the third party payment system 49.

Referring back to FIG. 1, the payment processing network 10(*d*) forwards the authorization request to the issuer in step 7 and processes the transaction based on the authorization response message. In some embodiments, the payment processing network 10(*d*) can communicate the third party payment system 10(*a*) prior to any communication with the issuer 10(*e*) in order to determine the issuer associated with the account in the authorization request message sent by the merchant. This may occur in situations where an alias associated with the account is utilized as the payment data loaded to the mobile device 10(*b*) or if a direct transaction is conducted between a user of the third party payment system, e.g., a transfer to another user on the system.

In certain embodiments, the payment processing network 10(*d*) can then communicate a cleared transaction and details to the third party payments system 10(*a*) after the transaction is complete, shown in step 8. Such transaction details can be similar to those provided in online banking sites, which provide the time and date of the transaction, the amount and the payee (e.g., merchant). This allows the user to be able to log into his or her account with the third party payment system 10(*a*) and view any transactions conducted via a registered payment account on the system. In some embodiments, only transactions conducted via the third party payments system are posted to the account, e.g., those that occurred while the application is opened and payment data is loaded on the mobile device and/or conducted with the alias of the account.

II. Methods

Figure 5:
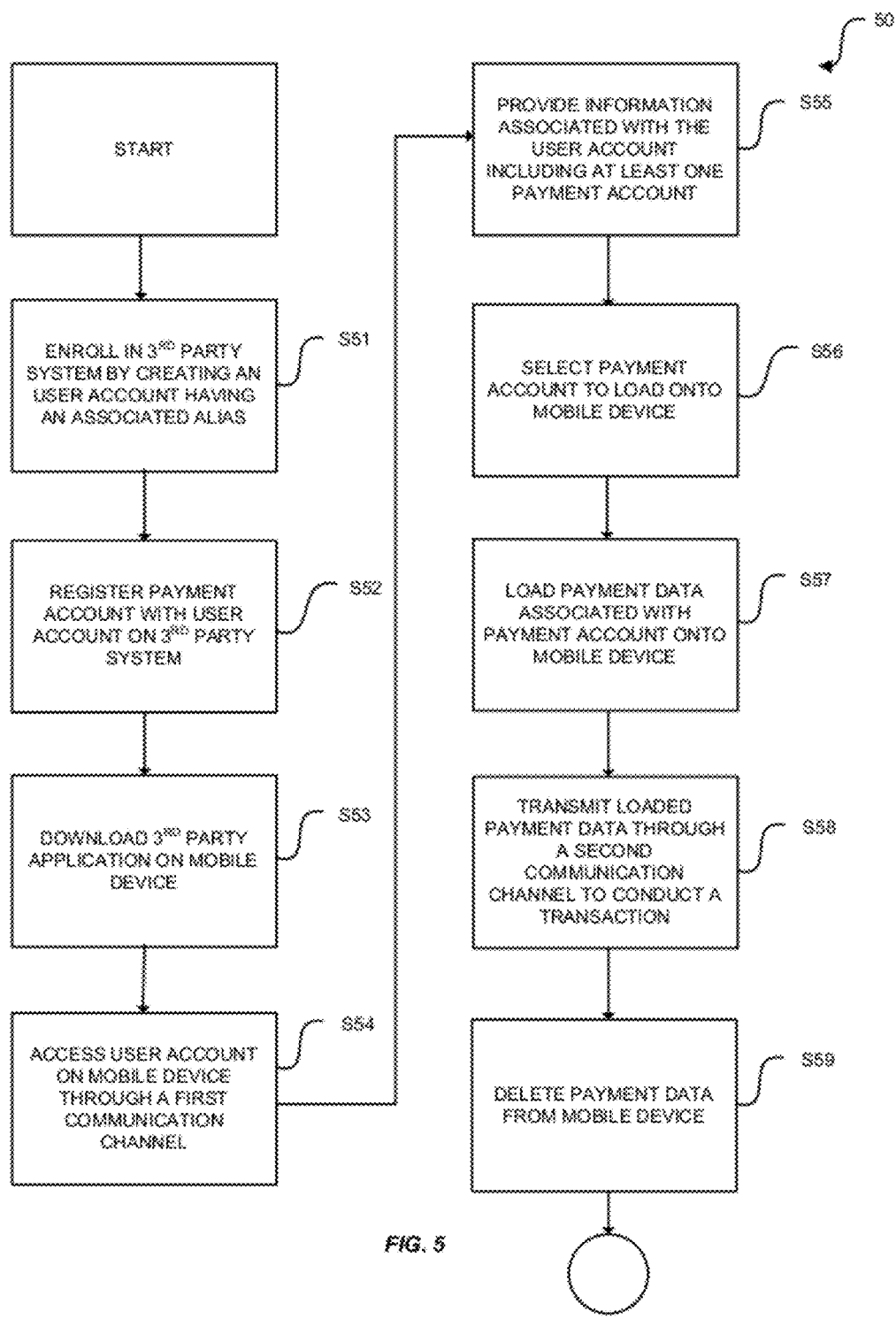
FIG. 5 shows a method for conducting a transaction through a third party payment system according to embodiments of the invention.
Figure 6:
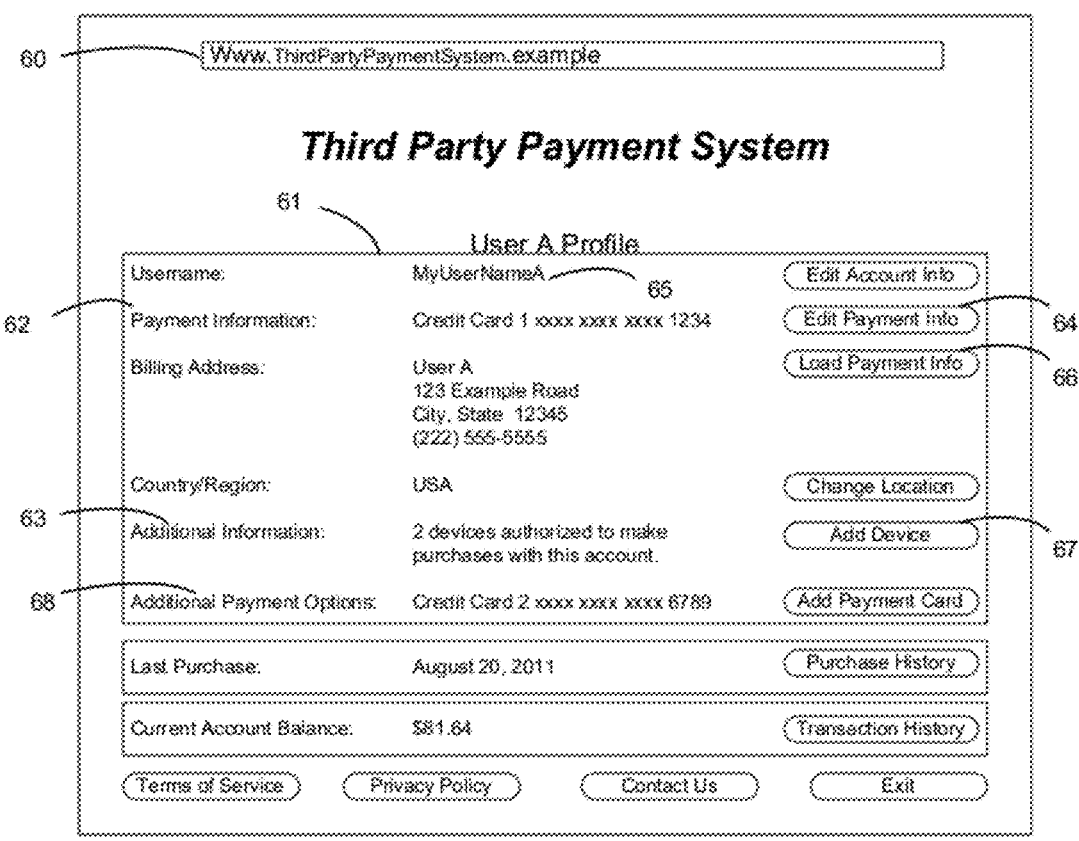
FIG. 6 shows a screen shot of a user profile according to embodiments of the invention.
Figure 7D:
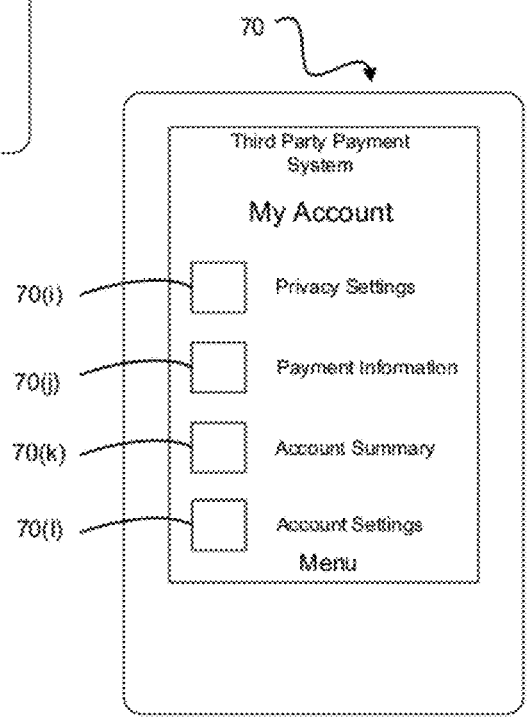
Figure 7E:
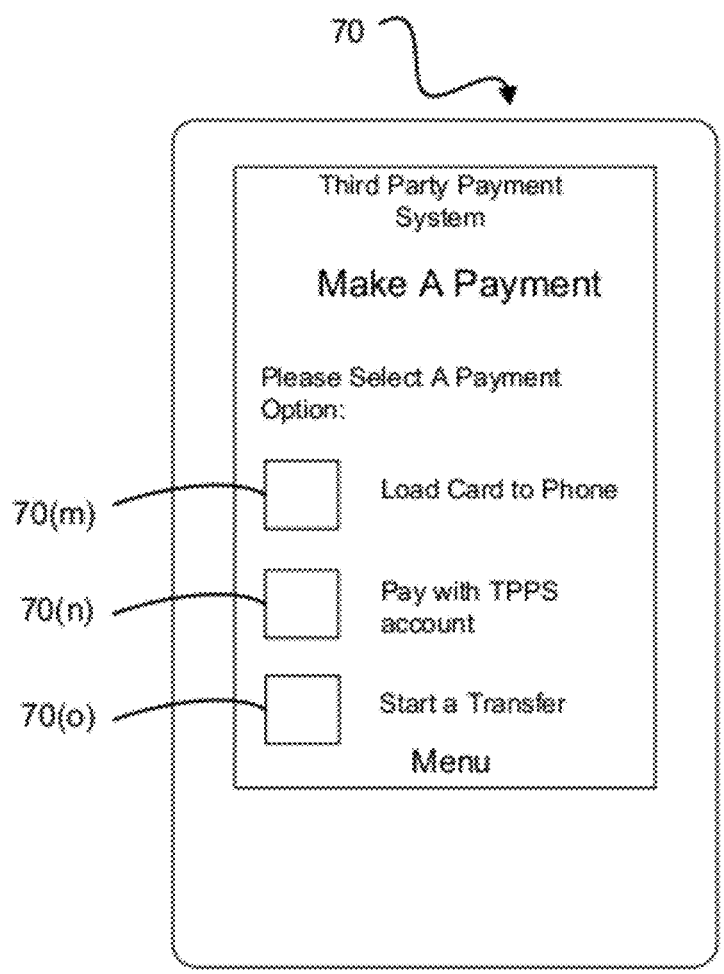

A method for conducting a transaction through a third party payment system is provided in FIG. 5. The method in FIG. 5 is discussed with further reference to exemplary embodiments shown in FIGS. 6-7E. The screenshots of a user interface provided within FIGS. 6-7E are exemplary and are utilized to demonstrate the functionality provided by the system of FIG. 1. Accordingly, such interfaces may vary in appearance.

Referring now to FIG. 5, in step S51, the method first includes enrolling a user with the third party payment system to establish a user account. The user of the account can then be assigned an alias for the user account, such as a username. In some embodiments, the third party payment system automatically generates an alias for the user when the account is created. In other embodiments, the user is able to enter his/her own alias.

The user can enroll in the third party payment system through the portal, such as a website owned by the third party payment system. The user can enroll through any device, e.g., a computer, a mobile phone, or any other device allowing the user to input data and communicate through the network. In some embodiments, the user can enroll in person at merchant location associated with the third party payment system. The user can enroll by providing contact information. In some embodiments the user can provide payment data for at least one payment account during enrollment. The payment account can include a payment device, such as a credit card, debit card, gift card, etc. or a banking account, such as a savings account or a checking account.

In step S52, the user registers one or more payment accounts with the third party payment system. The user can complete registration of a payment account during initial enrollment or at anytime after an account has been established. For example, a user can create an account and then purchase a product from the third party payment system with a payment device, such as a credit card. The third party payment system can prompt the user to enter the payment data for the payment device and then ask permission to save the payment data for later use. The user can register a plurality of payment accounts with the third party payment system and can decide during registration which accounts will be accessible for loading onto a mobile device.

Referring now to FIG. 6, an exemplary screenshot of an enrolled user account is show in one embodiment. As shown, a user can log into an account via a website 60 for the third party payment system. The user interface can include user profile 61 information, such as an alias, e.g., username "MyUserNameA" 65, payment account information 62 additional information about the payment account 63, and any additional payment accounts 68 currently registered. The screen may contain one or more buttons 64, 66, 67 for registered cards. Each button provides the user the ability to modify account information, including payment account information. Some buttons 66, 67, further allow a user to share payment information stored within the third party payment system with other systems and services. In certain implementations, these buttons 66, 67, are visible only on targeted accounts. For example, only credit cards, debit cards and gift cards can display such buttons 66, 67, to a user. The buttons 66, 67, may provide additional benefits to the third party payment system's large card-onfile community. In certain embodiments, this may only be visible for targeted cards and cardholders, and can be used as a way to increase enrollment in user services.

As shown in FIG. 6, a "Load Payment Info" button 66 is illustrated. When this button 66 is selected, the payment data for the registered card 62 on file with the third party payment system can be transferred, or loaded, to the user's mobile device. The mobile device can be registered with the third party payment system as well (e.g., noted in the "Additional Information" section), to ensure a more secure transfer and use of the payment data. Additional devices can be added to the account and through an "Add Device" button 67. In some embodiments, specific devices can be associated with specific registered accounts. For example, a credit card associated with parent and a child can be registered to both the parent's and the child's third party payment system account and can include only the child's mobile phone as an authorized device.

Clicking the buttons can be a better (easier, more secure) way to load payment credentials to a phone. And, in some cases, credentials (e.g., payment data) may not be needed on the phone to provide for additional security. In one example, users may integrate their payment information with RTM (real time monitoring). An RTM loyalty program can be where money or third party payment system credit are received for fulfillment. In another example, users can integrate their payment information with a money transfer service, which can receive and send fees to other persons and entities.

Referring back to FIG. 5, in step S53, a user can download an application to a mobile device registered with the third party payment system in order to more easily and securely navigate the payment system. The application can be downloaded when the user initially visits the third party payment application website or prior to accessing the third party payment system. The application can include additional security features, e.g., encryption technique, which ensure that any communication between the third party payment system and the user's mobile device is secure. After download, an application icon 70(*a*) can appear on the user interface 70(*b*) of the mobile device 70, such as shown in FIG. 7A.

In step S54, the user can access the user account with the mobile device 70, as shown in FIG. 7B. The user interface can identify the name of the third party payment system 70(*c*) and can be prompt the user to enter an account alias, e.g., assigned during enrollment, and a security feature, such as a password, PIN, or biometric data in fields 70(*d*) provided in the user interface. After entering the correct information, the user can be granted access to the user account on the third party payment system. As provided in FIG. 7C, the user may first be shown a user profile interface, which provides the user the ability to view the user's account, e.g., "My Account" 70(*e*), to view the user's past transactions, e.g., "My Transactions" (70(*f*), to load a payment account to the phone and/or conduct a transfer, e.g., "Make a Payment" 70(*g*), or to search products offered on the third party payment system's website, e.g., "Search Products" 70(*h*).

In step S55, the user can be provided various aspects relating to the user account, including a registered payment account. The user can be provided this information through a display of the mobile device being utilized to access the account, through a voice recording provided through the third party payment system, or by another communication medium. Referring to FIG. 7D, in one embodiment, the user may wish to view the user account under "My Account" in order to modify privacy settings for the account on the mobile device 70, e.g., "Privacy Settings" 70(*i*), to add, view, or modify payment accounts, e.g., "Payment Information" 70(*j*), view registered accounts and account balances, such as credits, rewards points, etc., e.g., "Account Summary" 70(*k*), or to modify and view account settings, such as to change an alias or security feature of the account, e.g., "Account Settings" 70(*l*). If a user has no payment account, which can be loaded to a mobile device, the user may wish to register a payment account and enable loading capabilities through the "My Account" interface.

Referring back to method 50 in FIG. 5, in step S56, the user can navigate through the user interface of the application in order to locate and select payment account to be loaded on the mobile device 70. The user can select an available account through the "Make A Payment" option provided on the user's home screen after login. Once this option is a selected all available payment options that can be utilized are shown to the user, such as illustrated in FIG. 7E. For example, the user can chose to complete a transfer to another user on the third party payment system with the "Start a Transfer" 70(*o*) option. The user may then be prompted to enter the other accountholder's alias and/or other contact information in order to conduct the transfer. A transfer could be initiated over-the-air, or it could be initiated when mobile device is connected to a computer during a data synchronization (sync) process. The user can also select to "Pay with TPPS account" 70(*n*) (third party payment system account), such as through a balance accumulated with the account from receiving transfers from other account holders and/or rewards points, etc. Finally, the user can select to "Load Card to Phone" 70(*m*) in order to utilize a payment account registered on the third party payment system to conduct a transaction. After selection, each payment account can be shown with an identifier of that account and provide the user with an option to select the account. If the user has only one payment account registered and/or a default payment account, the selection of the "Load Card to Phone" 70(*m*) option can cause the payment data associated with that account to load to the user's mobile device. As previously mentioned, if a payment account is not available within the user's account, the user can navigate through the application and add a payment account or enable an existing account to be able to load that account to the mobile device.

Referring again to FIG. 5, in step S57, once the user has selected to load a payment account to the user's mobile device, the payment data associated with the selected payment account can be received by the mobile device. The payment data can be received through the network via any known wireless communication techniques that can be utilized to securely transfer data between the third party payment system and the mobile device.

Next, in step S58, the user can conduct a transaction with the mobile device. The mobile device can be enabled to perform remote payments or brick and mortar type payments. The mobile device can provide a message on the user interface, which indicates that the mobile device is being utilized as a certain payment account (e.g., an identifier of that account). In other embodiments, the user can be provided a message, which indicates that the payment data has been received and is to be utilized in a certain allotted time period. In further embodiments, such as when the user's account settings allow for the user to permanently download the payment data, the user can be provided with a message indicating that the payment account data has been successfully downloaded and stored on the mobile device. In certain embodiments, the application may include a library of icons for each type of payment account and provide such icon on the user interface when a payment account has been loaded to the mobile device. In some embodiments, the third party payment system application may remain open and running in the background while the users utilizes other mobile device functions. The mobile device can then communicate the loaded payment data to a merchant's POS terminal once a query signal is received by the mobile device. Accordingly, the user may not be shown any information relating to the loaded payment data on the user interface of the mobile device, though the mobile device may be still be utilized as a payment device.

Finally, in step S59, once the user has utilized the mobile device to conduct a transaction, the loaded payment data can be deleted from the mobile device. This may occur in response to a predetermined event, such as the one time use of the mobile device at a merchant location, the expiration of a predetermined time period (e.g., decay of data), or the closure of the third party payment system application and subsequent logout of the user from the user account on the mobile device. In other embodiments, the user can manually input to delete the payment data on the mobile device. For example, after use at a merchant location, a window could pop up on the user interface of the mobile device and prompt the user to "Use this payment account for another transaction" or "Delete this payment account now". The first option may be useful if the user is going to complete another purchase in a short amount of time. However, as previously noted, the communication channel created between the user's mobile device and the third party payments system remains open during use of the loaded payment data on the mobile device during the transaction in some embodiments, e.g., such as when the payment data is not set to decay or automatically delete after user on the mobile device. Accordingly, if a connection is lost between uses, the user may need to access the account again and load the payment data again.

III. Computer Apparatuses and Access Devices

Figure 8:
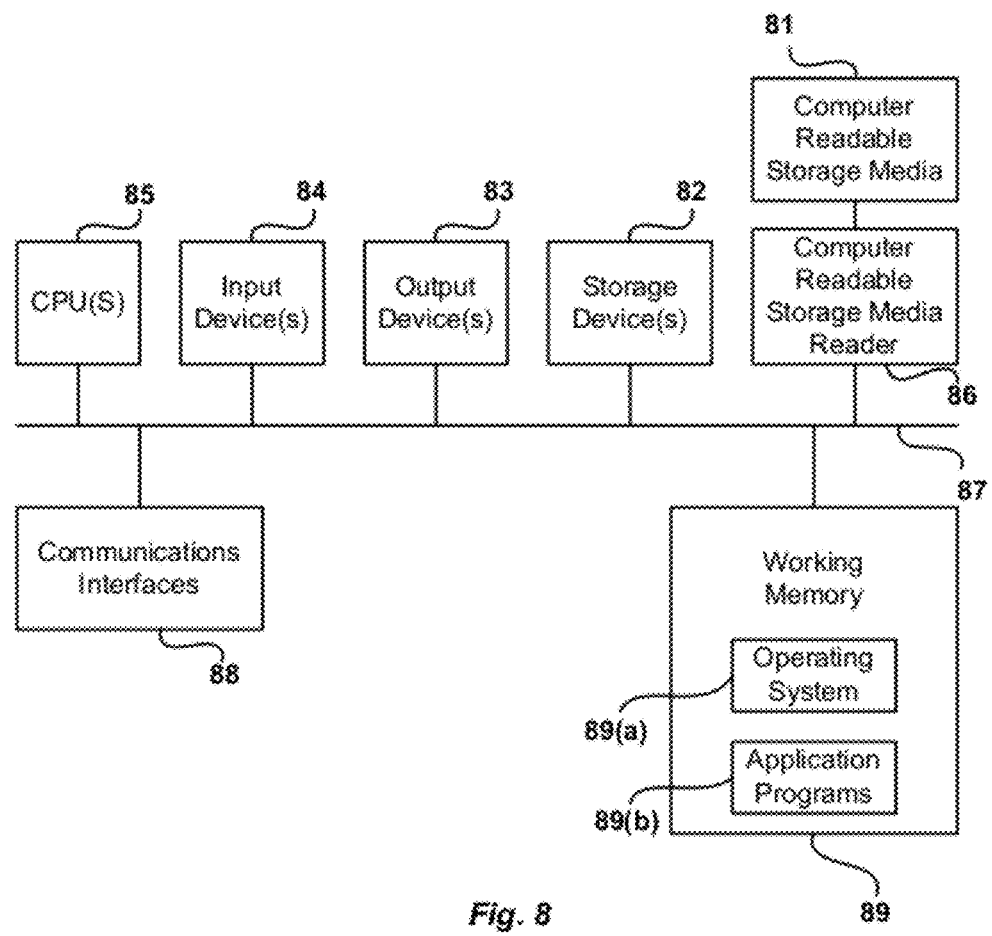
FIG. 8 shows an exemplary computer system, in which various embodiments may be implemented.
Figure 9:
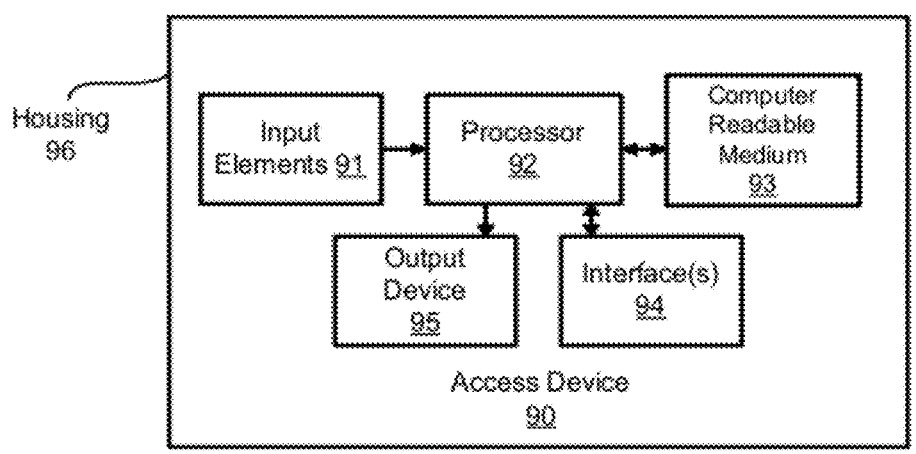
FIG. 9 shows an exemplary access device according to embodiments of the invention.

Exemplary computer apparatuses and access devices are described with reference to FIGS. 8-9. In particular, an exemplary computer system, such as that utilized for a central processing server, a personal computer, e.g., for user enrollment and/or online transactions, and/or a merchant register, is illustrated in FIG. 8. An exemplary access device, which may be utilized at a merchant location to retrieve payment data from a user's mobile device during a transaction, is illustrated in FIG. 9

FIG. 8 is a block diagram of typical computer system 80 configured to execute computer readable code to implement various functions and steps according to various embodiments of the present invention.

The computer system 80 is representative of a computer system capable of embodying the present invention. The computer system 80 can be present in any of the elements in FIGS. 1 through 4, including the computer(s) operating the third party payment system as described above. It will be readily apparent to one of ordinary skill in the art that many other hardware and software configurations are suitable for use with the present invention. For example, the computer system 80 may be a desktop, portable, rack-mounted or tablet configuration. Additionally, the computer system 80 may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board. Various embodiments may be based upon systems provided by daVinci, Pandora, Silicon Color, or other vendors.

In one embodiment, computer system 80 typically includes output devices 83 (e.g., display), input devices 84, communications interfaces 88, one or more central processing units (CPUs) 85, a working memory 89, computer readable storage media 81 and media reader 86, and one or more storage devices 82. In various embodiments, display (monitor) may be embodied as a CRT display, an LCD display, a plasma display, a direct-projection or rear-projection DLP, a microdisplay, or the like. In various embodiments, the display may be used to display user interfaces and rendered images.

In various embodiments, a user input devices 84 are typically embodied as a computer mouse, a trackball, a track pad, a joystick, wireless remote, drawing tablet, voice command system, and the like. User input device 84 typically allows a user to select objects, icons, text and the like that appear on the display via a command such as a click of a button or the like. An additional specialized user input device, such a magnetic stripe, RFID transceiver or smart card reader may also be provided in various embodiments. In other embodiments, user input devices 84 include additional computer system displays (e.g. multiple monitors). Further user input devices 84 may be implemented as one or more graphical user interfaces on such a display.

Embodiments of communication interfaces 88 typically include an Ethernet card, a modem (telephone, satellite, cable, ISDN), (asynchronous) digital subscriber line (DSL) unit, FireWire interface, USB interface, and the like. For example, communication interfaces 88 may be coupled to a computer network, to a FireWire bus, or the like. In other embodiments, computer interfaces 88 may be physically integrated on the motherboard of the computer system 80, may be a software program, such as soft DSL, or the like.

RAM and disk drive 1080 are examples of tangible computer readable storage media 81 configured to store data such user data, account data, merchant data, third-party service provider data, payment network data, abstraction layer databases and look-up tables and other executable computer code, human readable code, or the like. Other types of tangible computer readable storage media 81 include magnetic storage media such as floppy disks, networked hard disks, or removable hard disks; optical storage media such as CD-ROMS, DVDs, holographic memories, or bar codes; semiconductor media such as flash memories, read-only-memories (ROMS); battery-backed volatile memories; networked storage devices, and the like. The computer system 80, can include a computer readable storage media reader 86, such as a hard, floppy or optical disk drive, or universal serial bus port capable of reading the computer readable storage media 81.

In the present embodiment, computer system 80 may also include software that enables communications over a network such as the HTTP, TCP/IP, RTP/RTSP protocols, and the like. In alternative embodiments of the present invention, other communications software and transfer protocols may also be used, for example IPX, UDP or the like.

In various embodiments, computer system 80 typically includes familiar computer components such as a processor, e.g., CPUs 85, and memory storage devices 82, such as a random access memory (RAM), disk drives 86, and system bus 87 interconnecting the above components. The computer system 80 can also include a working memory 89, e.g., RAM, EEPROM, ROM, which stores computer readable instructions executable by the processor, such as the operating system 89(*a*) and application program software 89(*b*).

In some embodiments, the computer system 80 includes one or more Xeon microprocessors from Intel. Further, in the present embodiment, the computer system 80 typically includes a UNIX -based operating system.

Referring now to FIG. 9, an exemplary access device 90, such as a reader, is illustrated in one embodiment. The access device 90 can be communicatively coupled to a merchant register (not shown) to form a point of sale terminal. The access device 90 can include one or more interfaces 94 (e.g., Universal Serial Bus (USB) connector, wired connection, etc.), one or more input elements 91 (chip card reader, Magstripe reader, barcode scanner, etc.), a housing 96, one or more output elements 95 (display, printer, external storage device), and a computer readable medium (CRM) 93 for storing instructions to read and write data, for example. In one embodiment, the access device is capable of generating a cryptogram each time a user device is read for added security. In the case of contactless communication with the user device, the input elements 91 can include a transceiver capable of short range, or near field communication (NFC), such as an radio frequency RF transceiver, or an optical scanner. The access device 90 can also be referred to as a card terminal or card reader.

Benefits of the present invention allow a user to have a simplified payment system, which is accessible through any device capable of communicating with a third party payment system. The user can conduct transactions with a singular payment device, while not being required to maintain payment data on the device when a transaction is not being conducted. Accordingly, the user is not burdened with the threat of payment data being stolen if the mobile device is lost or stolen. Additionally, the present invention saves time for the user because the user is not required to re-enter the same payment information each time a transaction is conducted, nor required to carry a physical payment device. However, the user can have ready access to payment data which is securely stored on the third party payment system. Thus, embodiments of the invention provide for a number of technical advantages, including improved data security (because payment credentials are stored on a third party site and are only used on a mobile device when needed), and more convenience to a consumer.

It should be understood that embodiments of the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method that utilizes payment data stored on a third party payment system, the method comprising:
   accessing a user account with a mobile device through a first interface of the mobile device in communication with a first communication channel, where the user account is stored on a database coupled to a third party server of the third party payment system, where the third party server is a merchant server, and where the user account is associated with at least one payment account registered with the user account, the at least one payment account comprising a first payment account;
   selecting the first payment account registered with the user account stored on the database coupled to the third party server of the third party payment system;
   loading payment data associated with the first payment account received from the database of the third party server onto a memory of the mobile device, where the payment data comprises a primary account number and a card verification value;
   transmitting the loaded payment data from the mobile device to an access device through a second short range communication channel that conducts a transaction, where the mobile device provides the payment data for the transaction directly from the memory of the mobile device instead of the payment data being provided by the third party server; and
   automatically erasing, by a removal engine in the mobile device, from the memory of the mobile device the payment data after a predetermined time, where the predetermined time includes a time period after a predetermined number of transactions have been conducted using the mobile device with the payment data stored thereon, where the predetermined number of transactions is greater than one.

2. The method of claim 1, further comprising: creating the user account on the third party payment system; and registering the at least one payment account with the user account.

3. The method of claim 1, further comprising;
   encrypting the payment data prior to loading the payment data in the memory.

4. The method of claim 1, where a user is assigned an alias that is associated with the user account.

5. The method of claim 4, where the payment data includes the alias.

6. The method of claim 4, where the transaction is a first transaction, and where the method further comprises:
   conducting a second transaction with the alias, where the alias accesses the payment data associated with the first payment account on the third party payment system.

7. The method of claim 6, where the second transaction is conducted using the first communication channel.

8. The method of claim 1 where the third party server comprises a computer readable medium comprising code for an enrollment engine.

9. The method of claim 1 where the third party server operates a merchant website.

10. The method of claim 1 where the third party server operates an electronic marketplace.

11. The method of claim 1 where the access device is located at a merchant that is different than the merchant that operates the merchant server.

12. A mobile device comprising:
a communication interface;
an antenna coupled to the communication interface that wirelessly transmits data across a first communication channel;
an input element;
a memory;
a computer readable medium; and
a processor coupled to the computer readable medium, the computer readable medium comprising code executable by a processor that implements a method comprising:
accessing a user account with the mobile device through the first communication channel, where the user account is stored on a third party payment system, where the third party payment system is a merchant payment system;
receiving a selection of a first payment account through the input element of the mobile device, where the first payment account is registered with the user account on the third party payment system; and
loading payment data associated with the first payment account onto the memory of the mobile device, where the payment data comprises a primary account number and a card verification value; and
transmitting the loaded payment data from the mobile device to an access device through a second short range communication channel that conducts a transaction, where the mobile device provides the payment data directly from the memory of the mobile device instead of the payment data being provided by a merchant operating the merchant payment system; and
automatically removing the payment data from the memory of the mobile device after a predetermined time,
where the antenna, the communication interface, the memory, the computer readable medium, and the input element are coupled to the processor, and where the mobile device further comprises
a removal engine adapted to erase the payment data from the mobile device after the predetermined time, and
where the predetermined time includes a time period after a predetermined number of transactions have been conducted using the mobile device with the payment data stored thereon, where the predetermined number of transactions is greater than one.

13. The mobile device of claim 12, where the method further comprises:
maintaining access to the user account through the first communication channel during the transaction.

14. The mobile device of claim 12, where the method further comprises:
creating the user account on the third party payment system, where a user of the user account is assigned an alias associated with the user account; and
registering the payment data for the first payment account.

15. The mobile device of claim 12 further comprising a payment data load and transaction engine adapted to run each time a user selects to load payment data to the mobile device.

16. The mobile device of claim 12 where a user conducts transactions with the mobile device while not being required to maintain payment data on the mobile device during times when a transaction is not being conducted.

* * * * *

UNITED STATES PATENT AND TRADEMARK OFFICE
CERTIFICATE OF CORRECTION

PATENT NO.         : 9,953,309 B2
APPLICATION NO.    : 13/237690
DATED              : April 24, 2018
INVENTOR(S)        : Mark Carlson and Ayman Hammad It is certified that error appears in the above-identified patent and that said Letters Patent is hereby corrected as shown below:

In the Claims

In Column 18, Line 54 please remove "further comprising;" and insert -- further comprising: --

Signed and Sealed this
Twenty-eighth Day of August, 2018

Andrei Iancu
*Director of the United States Patent and Trademark Office*